Figure 1:
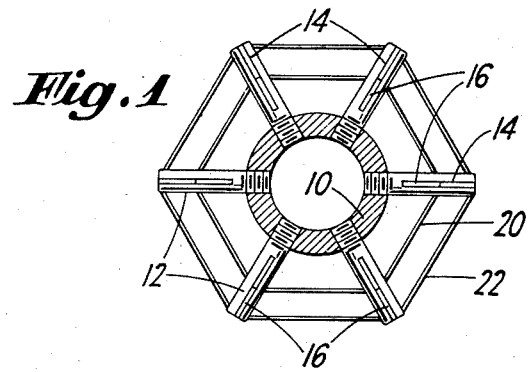

April 25, 1961  W. E. KINGSTON  2,981,672

NUCLEAR REACTOR FUEL ELEMENT

Filed Jan. 29, 1952

INVENTOR
WALTER E. KINGSTON
BY
ATTORNEY

United States Patent Office 2,981,672
Patented Apr. 25, 1961

2,981,672
NUCLEAR REACTOR FUEL ELEMENT

Walter E. Kingston, Bayside, N.Y., assignor, by mesne assignments, to the United States of America as represented by the United States Atomic Energy Commission Filed Jan. 29, 1952, Ser. No. 268,801
4 Claims. (Cl. 204—193.2)

This invention relates to wire fuel elements and their method of manufacture.

Many types and designs of fuel elements have been devised for use with the various types of nuclear reactors, the most common type being the plate type in which a slab of uranium is sandwiched between two sheets of zirconium. These fuel elements of the prior art although giving fairly satisfactory results do not provide for optimum core or surface area ratios and do not possess the desired dimensional stability. A description of the theory and practice of the design construction and operation of reactors in which the fuel element of the present invention may be used is generally set forth in the Science and Engineering of Nuclear Power, Addison Wesley Press, Inc., Cambridge, Massachusetts, volume I (1947), volume II (1949). Reference is made particularly to chapters 4, 5, 6, 8 and 9 of volume I of that publication.

It is an object of this invention to provide a fuel element which will allow for the provision of optimum core-to-surface area ratios.

It is a further object of this invention to provide a fuel element in which dimensional instability can be minimized.

It has been found that these objects and other advantages incidental to its application can be attained by making the fuel element in wire form. In this form the core containing fissionable matter is entirely sheathed within a metal which preferably has high corrosion resistance and a low nuclear absorption with the metal sheath intimately bonded to the core.

The wire fuel element of this invention can be made in any number of ways. A technique which is well adapted for this purpose includes the steps of swaging and/or wire drawing. In accordance therewith a billet or slug of material containing fissionable matter is first prepared in accordance with techniques well known in the art of preparing materials containing fissionable material. This billet is then enclosed or sheathed in a material which will withstand corrosion at high temperatures and which has a relatively low nuclear absorption. The sheathing is done in such manner that the billet is entirely enclosed with no parts exposed to the atmosphere. This component is then swaged and drawn at suitable temperature conditions until a composite wire of the desired dimensions is obtained.

It should be clearly understood that the wire type fuel element of this invention is not necessarily limited to any one specific type of material containing fissionable matter or to any specific type of sheathing material. The materials which will be hereinafter specified are only given as examples of satisfactory material suitable for use in a specific type reactor.

In a certain type reactor it has, for example, been found to be desirable to make the core material out of a zirconium-uranium alloy and to clad this with zirconium because of its good corrosion resisting properties in the presence of water at temperatures in the neighborhood of 300° C. Reactors of other types naturally make use of different core materials and different cladding which may either require more rigid or less rigid specifications and therefore permit the use of other materials such as stainless steel, aluminum or beryllium.

In those cases in which the zirconium-uranium alloy is to be used for the core material in the preparation of the wire type fuel element it is preferably made by powder metallurgical techniques wherein the required percent of uranium and zirconium are pressed and sintered to optimum density and then swaged and machined to a cylindrical shape of the required dimensions. Such bar could, of course, be rolled into a cylindrical form and could also by the use of the proper techniques be made by casting and rolling.

The method of preparing the zirconium or other sheathing material is not of any real significance provided no contaminants are introduced as a direct consequence of the particular method chosen. It is merely essential that the resulting product be tubular in form with an inside dimension slightly larger than the outside diameter, of the bar which is to be used as the core material. The tube should preferably be slightly longer than the bar so that some means can be provided for closing off the ends with zirconium plugs or by crimping after the bar has been inserted and therby completely shield it from the atmosphere.

In some cases it is desirable to place an intermediate substance in between the core material and the sheath in order to promote good bonding of the two substances during the formation of the wire. A thin layer of aluminum is an example of a substance which could be so used.

The wires which are produced in this manner could, for example, be wound in coils and thereby allow considerable rigidity with some freedom of movement.

Figure 2:
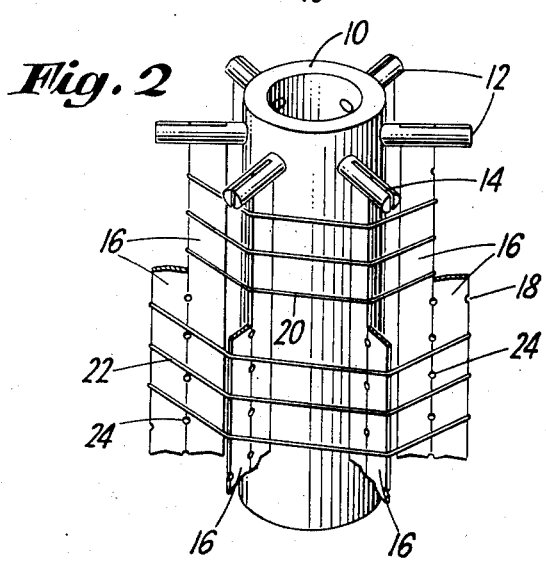
Figure 3:
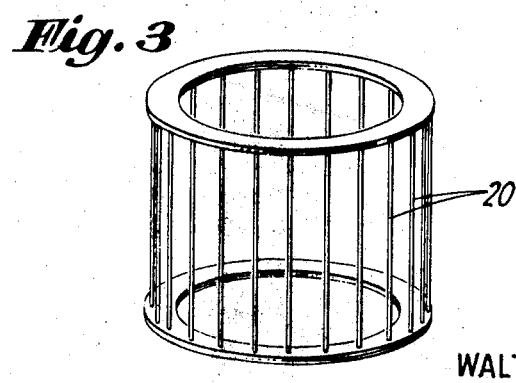

Another arrangement might be one in which the wire is strung in a grid-like arrangement either separated from each other or in tightly packed arrangement wherein the water is allowed to circulate through the spaces. Figure 1, Figure 2 and Figure 3 of the drawings show arrangements of this type.

Figure 1 is a plan view of the assembly of Figure 2.

Figure 2 of the drawing is a front elevation partly in section showing a spider web assembly in which the wire is used in a coil shape.

Figure 3 is a front elevational of an assembly showing the wire strung in a grid-like arrangement.

In the modification shown in Figure 1 the tube 10 is made of stainless steel upon which 6 lugs have been welded at one end with a similar number of lugs at the other end. These lugs 12 are each provided with a slot 14 into which a series of flat stainless steel plates can be placed. Each of the plates as shown in the drawings at 16 are provided with staggered semi-circular openings 18 so positioned that when a plurality of plates are laid against one another the semi-circular openings meet to form a complete circular opening as at 24 the wire fuel elements 20 are wound onto the supporting strips as can readily be seen in the drawings.

In some cases it has been found advantageous to enclose the core and sheath in a tubular shielding member during the swaging and wire drawing steps. In these cases it is, of course, necessary to remove the outer covering prior to the use of the composite wire as a fuel element.

In general it may be said that wire fuel elements having a good core-to-sheath bond and good corrosion resistance can be prepared in any desired length by proceeding in accordance with the following general operations:

(1) Assembling the components of the wire fuel element.
(2) Swaging, stripping and cleaning the assembled element.
(3) Heat treating.
(4) Centerless grinding to give a smooth exterior as well as to clean and remove contaminating material.
(5) Welding.
(6) Finishing.

In accordance with a preferred method of this invention the wire fuel element can be assembled, for example, from the following components: A steel shield having dimensions of 0.625" O.D. x 0.510" I.D., a zirconium sheath having dimensions of 0.500" O.D. x 0.267" I.D. and a zirconium uranium core having dimensions of 0.257" D. All the components should be thoroughly cleaned before assembly. Acetone has been found to be satisfactory for this purpose. The inside of the steel shield and the outside of the zirconium sheath should preferably be covered with an oxide which is stable at about 900° C. as, for example, magnesium oxide, zirconium oxide, or beryllium oxide. The material helps to keep down the contamination of zirconium by iron. The zirconium uranium core is then inserted within the zirconium sheath which is in turn inserted within the steel sheath after which the steel tube can be sealed with a steel plug which can be welded to the tube by an argon arc welding process.

This assembly may then be heated in a hydrogen atmosphere or an inert gas atmosphere, up to about 900° C. at which temperature the assembly can be swaged from 0.625" O.D. to 0.230" O.D. in a number of passes. The swaging temperature may then be lowered to approximately 800° and swaging continued down to a desired size which may be in the neighborhood of 0.130". The initial swaging temperature is quite critical if good results are to be obtained. It has been found that at temperatures substantially above 900° C. the zirconium sheath picks up sufficient iron from the shielding member that the end product is contaminated to a considerable degree whereas at temperatures below 830° the core material is still too hard to permit the formation of a good sound bond between the core and the zirconium sheath.

After the wire has been reduced to the proper size the steel may be stripped therefrom (in a 50% nitric acid bath) to completely remove any iron which may contaminate a portion of the surface. The wire can further be pickled in a 5% hydrofluoric acid bath if further cleansing is deemed desirable. After passing through this stripping and cleaning treatment it may be swabbed with a solution of hydrochloric acid and potassium ferrocyanide to test for the presence of iron contamination. A blue color on the swab would indicate the presence of iron.

Since the swaged wire frequently shows a string of inclusions along the sheath core interface it is preferable to heat the wire for one hour at about 900° C. This heat treatment can be carried out either in vacuum or in helium gas. When the material is heat treated in a vacuum tube furnace the surfaces may again become contaminated in which case the contaminated layer can be removed with dilute hydrofluoric acid.

When the wire is heat treated in a helium atmosphere it acquires a dark coating which resists attack by 5% hydrofluoric acid. However, the heat treated wire is attacked by water at 600° F. and it is possible to remove the contaminated layer by liquid honing after which the wire is corrosion resistant.

Since the wire formed normally has a contaminated surface after stripping it is often preferable to grind it to give it a smooth exterior. It has been found that when the diameter is reduced about 0.01" by grinding it is usually sufficient to clean up all but the deepest corrugations and in addition remove most of the contaminated metal.

Wires formed in this manner can be linked to one another by a welding process to form wires of infinite length. To accomplish this it is usually desirable to first protect the ends of the wire by welding a pin of zirconium to each end. The welding method which has been most satisfactory to date is the normal resistance welding although the heliarc process has also given good results. When the fuel wires are joined by resistance welding it has been found preferable to carry out the welding operation before centerless grinding the wire since the heat affected metal frequently acquires a surface that is susceptible to corrosion even though the joint may be flooded with helium during the welding operation. Although this skin is difficult to remove by pickling in dilute hydrofluoric acid it can later be removed during the grinding operation. Joints which are formed in this way are quite good and the metal can be bent several times through arcs of 30° and 60° without any indication of weld-line failures. Although welds can be made by the heliarc welding process results obtained up to now have not been as satisfactory as with the resistance welding operation.

In those cases in which the wire is centerless ground to size before welding the skin formed during the welding process at the point of juncture can be removed by a liquid honing (vapor blasting) process.

While the above description and drawings submitted herewith disclose a preferred and practical embodiment of the method of making the wire type fuel element of this invention it will be understood by the specific details of construction and arrangement of parts as shown and described are by way of illustration and are not to be construed as limiting the scope of the invention.

What is claimed is:

1. In a nuclear reactor a wire fuel element comprising a core of uranium concentrically disposed within and bonded to an intermediate sheath of aluminum and an outer metal sheath bonded to and concentric with said intermediate sheath, the metal of said outer sheath being selected from the group consisting of beryllium, zirconium and stainless steel.

2. The wire fuel element of claim 1 in which the outer sheath is beryllium.

3. The wire fuel element of claim 1 in which the outer sheath is zirconium.

4. The wire fuel element of claim 1 in which the outer sheath is stainless steel.

References Cited in the file of this patent

UNITED STATES PATENTS

| | | |
|---|---|---|
| 1,465,553 | Kirk | Aug. 21, 1923 |
| 2,063,470 | Staples | Dec. 8, 1936 |
| 2,079,710 | Jacobson | May 11, 1937 |
| 2,124,657 | Ritzenthaler | July 26, 1938 |
| 2,253,035 | Kallmann | Aug. 19, 1941 |
| 2,386,119 | Jack | Oct. 2, 1945 |
| 2,555,372 | Ramage | June 5, 1951 |
| 2,708,656 | Fermi et al. | May 17, 1955 |

FOREIGN PATENTS

| | | |
|---|---|---|
| 648,293 | Great Britain | Jan. 3, 1951 |

OTHER REFERENCES

Chipman: "Metallurgy in the Development of Atomic Power," U.S.A.E.C. Document No. MDDC–539 (MIT), declassified November 25, 1946. 20 pages. Copy in Scientific Library.

Nature, vol. 166, No. 4222, September 30, 1950, page 535. Copy in Scientific Library.